3,385,862
5-t-BUTYL-3-PHENYL-2-OXADIAZOLONES
Jean Metivier, Paris, and Roger Boesch, Vitry-sur-Seine, France, assignors to Rhone-Poulenc S.A., Paris, France, a French body corporate
No Drawing. Continuation-in-part of application Ser. No. 416,650, Dec. 7, 1964. This application Jan. 14, 1966, Ser. No. 520,674
Claims priority, application France, Dec. 13, 1963, 957,151; Oct. 29, 1965, 36,781, Patent 90,369
13 Claims. (Cl. 260—307)

ABSTRACT OF THE DISCLOSURE

The compounds of the invention are 5-t-butyl-3-phenyl-2-oxadiazolones. They are prepared by reacting the appropriate 1-trimethylacetyl-2-phenyl-hydrazine with phosgene. Herbicidal compositions containing them and the manner of use thereof are also disclosed.

This invention relates to new oxadiazolone compounds, to herbicidal compositions containing them, and to their use. It is a continuation-in-part of our application Ser. No. 416,650 filed Dec. 7, 1964 (now abandoned).

According to the present invention, there are provided the 5-t-butyl-3-phenyl-2-oxadiazolones of the formula:

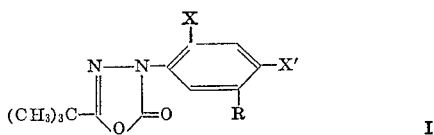

in which X and X' are each halogen and R is hydrogen or alkoxy of 1 to 4 carbon atoms, especially methoxy, ethoxy or isopropoxy.

The compounds of Formula I are prepared by the process which comprises reacting phosgene with a hydrazide of the formula:

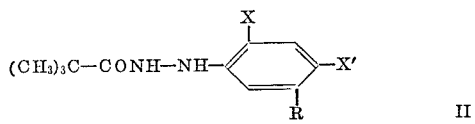

in which X, X' and R are as hereinbefore defined. The reaction is carried out in an inert organic solvent or water at a temperature between 20° and 120° C. As the organic solvent there may be used, for example, an aromatic hydrocarbon, such as benzene or toluene, or an ether such as dioxan.

The oxadiazolone compounds of Formula I possess remarkable herbicidal properties which are useful in agriculture; in particular, they are useful for combatting graminaceous and dicotyledonous weeds, for example Penicum, crabgrass, foxtail, pigweed, mayweed and dandelion, in crops such as rice, carrot, cabbage, pea, broad bean and maize. Preferred compounds are those in which X and X' are both chlorine and R is hydrogen or methoxy, such as 5-t-butyl-3-(2,4-dichlorophenyl)-1,3,4-oxadiazol-2-one, which is outstanding in its herbicidal activity.

According to a feature of the present invention, there are provided herbicidal compositions containing at least one oxadiazolone compound of Formula I in association with one or more diluents compatible with the oxadiazolone and suitable for use in agricultural herbicidal compositions, the compositions containing between 0.005 and 50% by weight of said oxadiazolone. The compositions may be solid if there is employed a powdered solid compatible diluent such as talc, calcined magnesia, magnesium silicate, kieselguhr, tricalcium phosphate, powdered cork, absorbent charcoal, or a clay such as kaolin or bentonite. Instead of a solid diluent, there may be used a liquid in which the oxadiazolone is dissolved or dispersed. The compositions may thus take the form of suspensions, emulsions or solutions in organic or aqueous-organic media, for example aromatic hydrocarbons such as toluene or xylene, acetophenone, or mineral, animal or vegetable oils, or mixtures of these diluents. The compositions in the form of suspensions, emulsions or solutions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When desired, emulsions of the oxadiazolones may be used in the form of self-emulsifying concentrates containing the active substance dissolved in the dispersing agent or in a solvent containing a dispersing agent compatible with the solvent, a simple addition of water producing compositions ready for use.

The solid compositions are preferably prepared by grinding the oxadiazolone with the solid diluent and optionally a wetting, or dispersing agent, or by impregnating the solid diluent with a solution of the oxadiazolone in a volatile solvent, evaporating the solvent, and if necessary grinding the product so as to obtain a powder.

Fertilizers and adjuvants such as adhesives may be admixed with the aforesaid compositions.

The oxadiazolone compounds of Formula I may be applied in a dosage of from 0.5 to 25 kg. per hectare in order to combat graminaceous and dicotyledonous weeds among food crops.

The following example illustrates the preparation of the oxadiazolone compounds of the present invention.

EXAMPLE I

A solution obtained from 1-trimethylacetyl-2-(2,4-dichloro-5-isopropyloxyphenyl)hydrazine (28.5 g.) and a 20% solution (132 ml.) of phosgene in toluene is heated gradually to about 100–110° C. until the evolution of gas ceases. After concentration of the toluene solution under reduced pressure, the residual solid is recrystallised from ethanol. 5-t-butyl-3-(2,4-dichloro-5-isopropyloxyphenyl)-1,3,4-oxadiazol-2-one (23 g.) is thus obtained, M.P. 90° C.

The initial 1-trimethylacetyl-2 - (2,4 - dichloro - 5 - isopropyloxyphenyl)hydrazine (M.P. 100° C.) is obtained by the action of trimethylacetyl chloride on 2,4-dichloro-5-isopropyloxyphenylhydrazine (M.P. 71° C.) in benzene in the presence of triethylamine.

By proceeding as described above and starting with appropriate phenyl-hydrazine starting materials, the following compounds are prepared:

5-t-butyl-3-(2,4-dichlorophenyl)-1,3,4-oxadiol-2-one, M.P. 64° C.

5-t-butyl-3-(2,4-dichloro-5-methoxy-phenyl) - 1,3,4 - oxadiol-2-one, M.P. 124° C.

5-t-butyl-3-(2,4-dichloro-5-ethoxy-phenyl) - 1,3,4 - oxadiazol-2-one, M.P. 101° C.

5-t-butyl-3-(2,4-dichloro-5-n-propoxy-phenyl) - 1,3,4 - oxadiazol-2-one, M.P. 83° C.

5-t-butyl-3-(2,4-dichloro-5-n-butoxy-phenyl)-1,3,4 - ozadiazol-2-one, M.P. 65–66° C.

5-t-butyl-3-(2,4-dichloro-5-sec-butoxy-phenyl)-1,3,4 - oxadiazol-2-one, M.P. 84° C.

5-t-butyl-3-(2,4-dichloro-5-isobutoxy-phenyl) - 1,3,4 - oxadiazol-2-one, M.P. 166° C.

5-t-butyl-3-(2-chloro-4-bromophenyl)-1,3,4-oxadiazol - 2-one, M.P. 86° C.

5-t-butyl-3-(2-bromo-4-chlorophenyl)-1,3,4-oxadiazol - 2-one, M.P. 62° C.

5-t-butyl-3-(2,4-dibromophenyl)-1,3,4-oxadiazol - 2 - one, M.P. 96° C.

The following example illustrates herbicidal compositions according to the present invention.

EXAMPLE II

To 1000 g. of 5-t-butyl-3-(2,4-dichlorophenyl)-1,3,4-oxadiazol-2-one are added 100 g. of a wetting agent obtained by the condensation of ethylene oxide (10 moles) and octylphenyl (1 mole). This mixture is then dissolved in a mixture in equal volumes of acetophenone and toluene. The volume of the solution is made up to 2000 ml. with the same solvent mixture. This solution may be employed, after dilution to 1000 litres with water, to combat Panicum in rice crops. The dilute solution obtained is sufficient to treat one hectare of crops.

According to another feature of the invention, a method for the control of graminaceous and dicotyledonous weeds growing in a food crop area, including orchards and plantations, especially a rice crop area, comprises applying to the aerial or exposed parts of the weeds a suitable formulation of an oxadiazolone compound of Formula I, the amount of applied oxadiazolone being sufficient for control of the weed but insufficient to cause substantial damage to the crop.

The dosage of oxadiazolone compound can vary in accordance with the nature of the weed or weeds to be controlled, the crop and the desired effect. In general, taking into account these factors, dosages of active material of 0.5 to 25 kg. per hectare give good results, for example in the control of Panicum in a rice crop.

In this composition, the 5-t-butyl-3-(2,4-dichlorophenyl)-1,3,4-oxadiazol-2-one can be replaced by a similar amount of any one of the other compounds of Formula I, e.g. one of those described in Example I.

We claim:
1. An oxadiazolone of the formula:

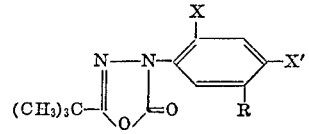

in which X and X' are each halogen, and R is hydrogen or alkoxy of 1 to 4 carbon atoms.

2. An oxadiazolone according to claim 1 in which X and X' are both chlorine.

3. An oxadiazolone according to claim 2 in which R is hydrogen.

4. An oxadiazolone according to claim 2 in which R is methoxy.

5. An oxadiazolone according to claim 2 in which R is ethoxy.

6. An oxadiazolone according to claim 2 in which R is n-propoxy.

7. An oxadiazolone according to claim 2 in which R is isopropoxy.

8. An oxadiazolone according to claim 2 in which R is n-butoxy.

9. An oxadiazolone according to claim 2 in which R is sec-butoxy.

10. An oxadiazolone according to claim 2 in which R is isobutoxy.

11. An oxadiazolone according to claim 1 in which X is chlorine, X' is bromine and R is hydrogen.

12. An oxadiazolone according to claim 1 in which X is bromine, X' is chlorine, and R is hydrogen.

13. An oxadiazolone according to claim 1 in which X and X' are both bromine and R is hydrogen.

References Cited

UNITED STATES PATENTS 3,202,673   8/1965   Metivier et al. _____ 260—307.1

NICHOLAS S. RIZZO, *Primary Examiner.*

R. J. GALLAGHER, *Assistant Examiner.*